United States Patent [19]

Guillet

[11] 4,176,145

[45] Nov. 27, 1979

[54] PHOTODEGRADABLE POLYMER COMPOSITIONS COMPRISING BLENDS OF POLYMERS WITH KETONE-CONTAINING BLOCK OR GRAFT COPOLYMERS

[76] Inventor: James E. Guillet, 34 Sagebrush La., Don Mills, Canada

[21] Appl. No.: 764,548

[22] Filed: Feb. 1, 1977

[51] Int. Cl.² .................... C08L 51/00; C08L 53/00
[52] U.S. Cl. .................................. 525/72; 525/78; 525/85; 525/77; 260/DIG. 43
[58] Field of Search .................. 260/876 R, DIG. 43

[56] References Cited

U.S. PATENT DOCUMENTS

| | | | |
|---|---|---|---|
| 3,853,814 | 12/1974 | Guillet | 260/63 R |
| 3,878,169 | 4/1975 | Guillet et al. | 260/63 R |
| 3,925,269 | 12/1975 | Miyoshi et al. | 260/2.5 B |
| 4,025,580 | 5/1977 | Taylor | 260/874 |
| 4,042,568 | 8/1977 | Guillet et al. | 260/65 |

*Primary Examiner*—Richard B. Turer
*Attorney, Agent, or Firm*—Hirons, Rogers & Scott

[57] ABSTRACT

Polymer compositions which have accelerated rates of degradation on exposure to ultraviolet radiation, e.g. direct sunlight in an outdoor environment, comprise a blend of a major proportion of a normal, standard synthetic polymer, e.g. polyethylene, and a minor proportion of a graft or block copolymer of a ketone group containing monomer, e.g. methyl vinyl ketone, graft or block copolymerized onto a backbone polymer e.g. of polyethylene. The composition can be molded, extruded and otherwise fabricated in the normal way to produce disposable, photodegradable plastic articles such as containers, wrapping films and the like.

12 Claims, No Drawings

PHOTODEGRADABLE POLYMER COMPOSITIONS COMPRISING BLENDS OF POLYMERS WITH KETONE-CONTAINING BLOCK OR GRAFT COPOLYMERS

FIELD OF THE INVENTION

This invention relates to synthetic polymer compositions, and more particularly to polymer compositions which will degrade upon exposure to ultraviolet radiation, for example direct sunlight, over a period of time.

BACKGROUND OF THE INVENTION

Polymer compositions in the form of plastic wrapping films, containers and other disposable items constitute a significant amount of waste garbage and litter, contaminating the environment as such unless disposed of in a proper manner. They pose a particular problem in that they are normally unaffected by natural erosive forces encountered in outdoor environments, over very extended periods of time. Indeed, at least until recently, the emphasis of plastics producers has been to stabilize polymer compositions against degradation so as to extend their useful shelf or service life. The discarding of synthetic polymer articles such as plastic wrapping films and containers as litter in remote outdoor areas where they cannot economically be collected for proper disposal is a particular problem. The present invention has as one of its objects the provision of a polymer composition which will photodegrade outdoors over a relatively short period of time, but which is nevertheless economical to produce and to fabricate into plastic articles.

BRIEF DESCRIPTION OF THE PRIOR ART

Proposals have been made in the past for polymer compositions of controlled lifetimes which will degrade over a period of time on exposure to ultraviolet radiation such as direct sunlight. These previous proposals have included the addition of photosensitizing agents to the polymers, and the introduction of photosensitizing chemical groups into the polymer structure, the objective being to produce a polymeric composition which is stable when exposed to visible light and photodegradable only in response to the incidence of ultraviolet radiation thereon. Such compositions are thus stable under artificial light and behind window glass, which filters out almost all the ultraviolet components of sunlight, so that the compositions have indefinite shelf life.

An example of a polymer composition having ultraviolet sensitizers added thereto is described in U.S. Pat. No. 3,830,764 Hudgin et al. An example of a polymer composition having photosensitizing chemical groups in its structure is described in U.S. Pat. No. 3,853,814 Guillet.

A problem encountered with polymer compositions containing added sensitizers of low molecular weight, as in U.S. Pat. No. 3,830,764, is the tendency of the additive to migrate out of the composition over a period of time, thereby reducing its effect as a photosensitizer and possibly contaminating substances with which the composition is in contact, such as food-stuffs wrapped in a film of the polymeric composition. Chemically modified polymers on the other hand have the chemical photosensitizing groups chemically bound therein, but tend to be expensive to make commercially, necessitating the modification of large scale and well established commercial polymerization facilities. A modified and more commercially attractive approach is described in U.S. Pat. No. 3,860,538 Guillet et al, where a small quantity of polymer containing photosensitizing ketone groups distributed throughout its polymer structure, is used as a masterbatch and mixed with a normal polymer to form a photodegradable polymer blend. This polymeric photosensitizer does not migrate out of the composition.

The masterbatch process described in U.S. Pat. No. 3,860,538 requires the production, by copolymerization, of a photodegradable random copolymer of a vinyl or vinylidene monomer and a vinyl or vinylidene ketone monomer such as methyl vinyl ketone. Then the copolymer is blended with a regular vinyl or vinylidene polymer, normally a polymer of the same monomer from which the photodegradable polymer is formed, to prepare a compatible blended polymeric composition. It is difficult to prepare random copolymers of monomers such as ethylene with vinyl or vinylidene ketone monomers, economically on a commercial scale. There are in fact only a very restricted number of monomers which will copolymerize with ethylene to form random copolymers therewith in standard, commercial ethylene polymerization processes and facilities, at an acceptable rate.

BRIEF SUMMARY OF THE INVENTION

An object of the present invention is to provide a novel polymer composition having an accelerated rate of photodegradation on exposure to ultraviolet radiation.

Another object is to provide a process for the production of photodegradable polymer compositions which can be operated economically on a large commercial scale.

A further and more specific object is to provide novel photodegradable polyethylene compositions and economic commercial processes for their production.

A further object of the invention is to provide a novel graft or block copolymer containing ketone groups which can be blended with regular polymers to induce photodegradability into the resultant polymeric composition.

According to one aspect of the present invention, therefore, there is provided a synthetic polymer composition having accelerated degradation on exposure to ultraviolet radiation, comprising an intimate mixture of:

(a) a major proportion of a normally solid synthetic polymer of at least one polymerizable monomer having the general formula

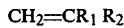

where $R_1$ represents a hydrogen atom or an alkyl group of from 1 to 6 carbon atoms, and $R_2$ is selected from the group consisting of a hydrogen atom, an alkyl group of from 1 to 6 carbon atoms, an aryl group, an aryl group substituted with one or two halogen or lower alkyl groups, a carboxylic acid group, a carboxylic acid lower alkyl ester group, a lower acyloxy group, a cyano group, an alicyclic group of not more than 8 carbon atoms, an alkoxy group of from 1 to 6 carbon atoms, an amido group and an alkenyl group of not more than 6 carbon atoms; and (b) a minor proportion of a compatible polymeric product of graft or block copolymerization of a grafting monomer onto a polymeric backbone, said polymeric backbone being a polymer of a first monomer of general formula $$CH_2=CR_3R_4$$

wherein $R_3$ represents a hydrogen atom or an alkyl group of from 1 to 6 carbon atoms, and $R_4$ is selected from the same groups from which $R_2$ above is selected, and said grafting monomer having the general formula $$R_6-\overset{O}{\underset{\|}{C}}-\underset{\underset{R_5}{|}}{C}=CH_2$$

wherein $R_5$ represents a hydrogen atom or an alkyl group of from 1 to 6 carbon atoms, and $R_6$ is selected from the group consisting of alkyl groups having 1 to 6 carbon atoms, aryl groups, alkaryl groups having up to 9 carbon atoms and alkenyl groups having up to 6 carbon atoms, said product of graft or block copolymerization containing from about 0.2 to about 20 weight percent of ketone carbonyl groups.

It has been found that, in a masterbatch composition of a normal, synthetic, non-photodegradable polymer and a photodegradable copolymer having keto carbonyl groups at a location adjacent to its polymeric chain, it is not necessary that the ketone groups be randomly distributed along and among the polymeric chains of the copolymer, in order to confer ultraviolet photodegradability upon the composition as a whole. The ketone groups can be concentrated at a specific location in the polymer, for example concentrated in a side, branch chain or in an end segment or a middle segment of a linear polymer chain. Thus the ketone copolymer can be a graft copolymer of ketone group containing monomer, optionally with another monomer, grafted onto a backbone chain of a normal polymer for example a hydrocarbon polymer, or a block copolymer having discrete polymeric segments of polymerized ketone monomer, optionally with another monomer, and discrete segments of a normal polymer.

This has very significant practical, commercial consequences, especially in respect of polyethylene compositions. Instead of having to prepare random copolymers of ethylene and a ketone by copolymerization of a mixture of these monomers, which as noted above is difficult and expensive on a commercial scale, one can according to the present invention prepare polyethylene, in the normal way, and then graft copolymerize the ketone containing monomer onto the preformed polyethylene.

DESCRIPTION OF THE PREFERRED EMBODIMENTS

Since the invention shows its greatest advantages in respect of ethylene and propylene polymer compositions, it will be further described with specific reference thereto, especially polyethylene. However, it should not be construed as being limited to blends thereof, with ethylene-ketone graft or block copolymers. It is similarly applicable to other synthetic vinyl or vinylidene polymers such as polymers and copolymers of styrene, butene, isobutylene, pentene, hexene, α-methylstyrene, methyl acrylate, methyl methacrylate, acrylonitrile, acrylic acid, vinyl acetate, acrylamide, butadiene, isoprene, chloroprene and the like.

The graft copolymer or block copolymer can be produced by any of the standard methods of graft or block copolymerization known in the art. In general, these processes include mixing the preformed polyethylene with the monomer or monomers to be grafted thereon, and then generating free radicals in the mixture so as to initiate the graft copolymerization, e.g. by subjecting the mixture to irradiation, the action of light, or including suitable chemical initiators of free radical polymerization, such as redox systems, azo compounds, peroxy compounds or the like, and then subjecting the mixture to known polymerization conditions. Suitably, the initiator is a peroxide compound, for example lauroyl peroxide, decanoyl peroxide, dicumyl peroxide or the like. Grafting occurs by free radical abstraction of a hydrogen atom from the polyethylene.

It is preferred according to the present invention to graft a mixture of the ketone monomer with another monomer onto the polyethylene. If ketone monomer is used alone, to produce homopolymer grafted polymer side chains, discolouration and cyclization may occur on account of continuous sequences of adjacent ketone groups in the polymer side chain. Copolymeric side chains reduce the risk of this occurring, since the copolymers provide "spacers" between the ketone groups in the side chains. Substantially any comonomer which is copolymerizable with the ketone monomer under the same polymerization conditions and at substantially the same rate as the ketone monomer can be used. Specific suitable monomers include styrene, α-methylstyrene, diethyl fumarate, methyl acrylate, methyl methacrylate, vinyl acetate, acrylic and ethyl acrylate and the like.

One specific preferred graft copolymerization process is a melt process, in which a polyethylene, preferably a relatively low molecular weight polyethylene, is melted and a mixture of grafting monomers and catalyst is added to it. The mixture is stirred for a time of about 5-6 half-lives of the catalyst. Then excess monomer is removed by application of a vacuum, and the grafted copolymer is poured out of the reaction vessel and allowed to cool.

In another process, polyethylene is mixed with water and the monomers and catalyst added. The mixture is stirred and the temperature is raised to initiate polymerization. After a suitable time, the solid product is separated and dried. Alternatively, the catalyst may be dissolved in an organic solvent and added to the polyethylene, the monomers added and the mixture heated to effect the polymerization.

The product which is formed as a result of the graft copolymerization step inevitably contains some homopolymer or copolymer formed from the polymerization or copolymerization of the grafting monomers alone. If desired, the graft copolymer can be separated from the other polymeric components so formed, e.g. by extraction with a suitable solvent. It is not necessary to separate this polymerized material from the graft copolymer, however, since it is molecularly dispersed therewith to form a compatible, homogeneous mixture which behaves as if it were totally graft copolymer.

The ketone monomer which is graft copolymerized onto the polyethylene or other polymeric backbone has the general formula $$R_6-\overset{O}{\underset{\|}{C}}-\underset{\underset{R_5}{|}}{C}=CH_2$$

wherein $R_5$ represents a hydrogen atom or a $C_1$-$C_6$ alkyl group, and $R_6$ represents a hydrogen atom, a $C_1$-$C_6$ alkyl group, an aryl group, an alkaryl group having up to 9 carbon atoms, or an alkenyl group having up to 6 carbon atoms. Specific preferred examples of suitable such ketone monomers include methyl vinyl ketone, ethyl vinyl ketone, methyl isopropenyl ketone, tertiary-butyl vinyl ketone, isobutyl vinyl ketone, isopropyl vinyl ketone, tertiary amyl ketone, isoamyl vinyl ketone and the like.

The amount of ketone monomer which is graft copolymerized onto the polyethylene depends to some extent upon the proportion in which the graft copolymer is to be mixed with the normal polyethylene, to form the final photodegradable composition. It should be sufficient to incorporate into the graft copolymer from about 0.2 to about 20 weight percent, and preferably from about 0.5 to about 7 weight percent, of ketone carbonyl groups derived from the ketone group containing monomer. When the chosen ketone monomer is methyl vinyl ketone, this corresponds to a copolymer containing from about 0.5 to about 50 weight percent, and preferably from about 2.5 to about 17.5 weight percent, of methyl vinyl ketone. The graft copolymer is blended with the normal synthetic polymer in amounts suitably in a weight ratio of from about 1.2 to about 1.50 and preferably from about 1:4 to about 1:50 and preferably from about 1:4 to about 1:24. These proportions are chosen in individual cases on the basis of the desired rate of photodegradation of the final blended polymer compositions, the amount of ketone carbonyl in the graft copolymer, and the relative costs of the polymeric components of the composition.

The method of mixing the polymeric components to form the polymer composition according to the invention is not critical, provided that an intimate dispersion of the components in the blend is formed. Methods of polymer blending known in the art can be used. These methods include dry mixing in a mixer, on a mill, on a Banbury mixer, or solution blending, or hot melt blending.

The ethylene-ketone graft copolymers of the invention show good compatibility with commercial polyethylenes, both high density and low density, which are currently available on the market. As noted previously, polyethylene normally presents considerable problems in the preparation of polymer blend compositions including it. As is known in the art, very few other polymers are sufficiently compatible with polyethylene to allow blends thereof to be prepared which have physical properties permitting them to be used for the preparation of plastic articles. This is probably a consequence of the chemical structure of the polyethylene molecules. The graft copolymers of ketone monomers on polyethylene described herein do, however, exhibit satisfactory compatibility with normal polyethylenes to allow preparation of useful blends therewith, in the proportion desired in the present invention.

Another specific example of a photodegradable composition according to the present invention is a blend of polypropylene and a graft copolymer of polyethylene with a ketone monomer graft copolymerized thereon, the ranges of polymers and monomers in the blend being as previously described. Propylene is a particularly difficult monomer to copolymerize with monomers containing polar groups, such as unsaturated ketones, since propylene will only polymerize to high molecular weight polymers under the action of catalyst systems which are generally deactivated by polar monomers such as unsaturated ketones. It is not therefore practical to make photodegradable polypropylenes by copolymerization of propylene.

The graft copolymers of ethylene and unsaturated ketones according to the present invention are, however, compatible with polypropylene, at least in the small amounts necessary to produce photodegradable polypropylene blends. Thus, the present invention provides useful photodegradable polypropylene compositions.

A further specific example of a graft copolymer according to the invention, useful for blending with polymers such as polyethylene or polypropylene for forming photodegradable polymeric compositions, is a graft copolymer comprising a substrate or backbone of ethylene-propylene copolymer, having graft copolymerized thereon ketone group containing polymeric or copolymeric side chains, as previously described. Such ethylene-propylene copolymers provide good grafting substrates, since they have substantial amorphous polymeric regions, and can be of low or high molecular weight as desired. The resulting graft copolymers are compatible in the ranges necessary to produce photodegradable polymer blends, with both polyethylene and polypropylene in accordance with the invention as well as with other polymers.

The polymer composition according to the present invention can be fabricated into plastic articles by fabrication techniques known in the art as useful for the corresponding synthetic polymers. No special modifications of normal molding, extruding, etc. procedures appear to be necessary. They behave essentially as known polymers from the same predominant monomers, and can be used in similar known applications, e.g. for making films, sheets, molded articles such as trays, bottles, cups, containers, cigar tips, blow molded articles, coatings, foams, fibres, ropes, etc., where the corresponding regular polymers are commonly used. A particularly useful application of the polymer compositions of the invention, especially the polyethylene composition, is in agricultural mulch film, for the temporary covering of agricultural crops in an outdoor environment.

The invention is further illustrated in the following specific examples.

EXAMPLE 1

A series of graft copolymers of ketone monomers and other co-grafting monomers, graft copolymerized onto polyethylene, were prepared, blended with commercially available normal polyethylenes and the resulting compositions tested for photodegradability on exposure to ultraviolet radiation.

The graft copolymers were prepared by a melt process. Commercially available branched polyethylene of relatively low molecular weight was melted in a flask at 130° C. Monomers and catalyst were added. The mixture was maintained at this temperature and stirred, for a period of time corresponding to 5–6 half-lives of the chosen peroxide graft copolymerization catalyst. This time of reaction varied from about 20 hours, when di-tertiary-butyl peroxide was used as catalyst, to about 5 hours when tertiary-butyl perbenzoate was used as catalyst. Then, any excess monomer was removed by the application of a vacuum to the reaction flask for a period of about 1 hour. The resultant grafted copolymer product was then poured out of the reaction flask and allowed to cool. Details of the various graft copolymers and their preparation are given in Table I.

In preparing graft copolymers 5, 6 and 7, attempts were made to destroy residual catalyst at the end of the polymerization by maintaining elevated temperatures for several half-lives of the catalyst after completion of the normal reaction period. Sample 7 as a result underwent a degree of cross linking, substantially increasing its molecular weight.

In Table I, the figures are weight percentages based upon the weight of backbone, substrate polymer used.

perature from certain of these compositions, and subjected to weathering tests. To perform this test, the sample was mounted in a UV Accelerometer, in which the sample is mounted on a drum which rotates around an ultraviolet emitting, mercury arc lamp, and thus treated with ultraviolet radiation for various periods of time. A control film of polyethylene, CIL560, of similar thickness was also used.

The photodegradable breakdown of the films on exposure was monitored by following the increase in carbonyl absorbance in the infra red spectrum of the sam- Table I

| Graft Copolymer Numbers | Substrate Polymer | Catalyst and Amount | Grafting Monomers and Amounts | Weight % Ketone Monomer Incorporated |
|---|---|---|---|---|
| 1 | Polyethylene molecular weight c 4,000 | Tertiary-butyl perbenzoate 2% | Methyl isopropenyl ketone 10% | 1.5 |
| 2 | Polyethylene molecular weight c 8,000 | Di-tert-butyl peroxide 2% | Methyl isopropenyl ketone 10% Diethyl fumarate 10% | 1 |
| 3 | Polyethylene molecular weight c 8,000 | Di-tert-butyl peroxide 2% | Methyl isopropenyl ketone 10% methylstyrene 10% | 3.5 |
| 4 | Polyethylene molecular weight c 8,000 | Di-tert-butyl peroxide 2% | Methyl vinyl ketone 10% α-methylstyrene 10% | 9 |
| 5 | Polyethylene molecular weight c 8,000 | Tertiary-butyl perbenzoate 1% | Methyl-isopropenyl ketone 5% | 1 |
| 6 | Polyethylene molecular weight c 8,000 | Tertiary-butyl perbenzoate 1% | Methyl vinyl ketone 5% α-methylstyrene 5% | 3 |
| 7 | Polyethylene molecular weight c 8,000 | Tertiary-butyl perbenzoate 1% | Methyl vinyl ketone 5% α-methylstyrene 5% | 3 |

In experiments to produce graft copolymers 6, 7, 8 and 9, heating was continued after completion of the normal reaction period, in an attempt to destroy residual catalyst.

Next, the graft copolymers so formed were blended with various amounts of a low density polyethylene which is commercially available, specifically that designated CIL560, available from Canadian Industries Ltd., Montreal Canada. These blends were prepared on a two-roll mill.

Films of approximate thickness 0.07 mm. were compression molded at 40,000 psi pressure and 140° C. temple, and by detecting the onset of brittleness as determined by the "crease-bend" test. The carbonyl absorbance is expressed as a carbonyl index Z, which is the ratio of absorbance at 1715 cm.$^{-1}$ to the absorbance at 1375 cm.$^{-1}$ (which latter is the absorbance of the $CH_2$ mode). When the carbonyl absorbance had reached a certain value, the crease-bend test was also carried out. In this test, the film is bent through to 180° and creased. If, on opening out the film following this operation, it breaks along the crease, the film is said to be brittle. The results are reported in Table II.

TABLE II

| Graft Copolymer number | Weight Ratio graft copolymer: polyethylene | Hours in Accelerometer | Carbonyl Index Z | Hours in Accelerometer | Carbonyl Index Z |
|---|---|---|---|---|---|
| Control | 0 | 0 | — | 220 | 0.373 |
| | | 40 | 0.058 | 280 | 0.600 |
| | | 80 | 0.112 | 340 | 0.929 |
| | | 160 | 0.232 | 420 | 1.265 |
| 1 | 1:9 | 0 | 0.118 | 160 | 0.541 |
| | | 40 | 0.178 | 220 | 0.882 |
| | | 80 | 0.261 | 280 | 1.171 |
| 2 | 1:9 | 0 | 0.194 | 160 | 0.546 |
| | | 40 | 0.375 | 220 | 0.979 |
| | | 80 | 0.451 | 280 | 1.330 |
| 3 | 1:9 | 0 | 0.296 | 220 | 1.352 |
| | | 40 | 0.316 | 280 | 1.690 |

TABLE II-continued

| Graft Co-polymer number | Weight Ratio graft copolymer: polyethylene | Hours in Accelerometer | Carbonyl Index Z | Hours in Accelerometer | Carbonyl Index Z |
|---|---|---|---|---|---|
| | | 80 | 0.482 | 340 | 2.289 |
| | | 160 | 0.819 | 420 | 2.956 |
| 4 | 1:9 | 0 | 0.856 | 220 | 1.149 |
| | | 40 | 0.352 | 280 | 1.508 |
| | | 80 | 0.497 | 340 | 1.851 |
| | | 160 | 0.794 | 420 | 2.298 |
| 4 | 1:9 | 0 | 0.471 | 280 | 1.850 |
| | | 80 | 0.377 | 360 | 2.788 |
| | | 160 | 0.844 | 400 | 2.973 |

Similar tests were carried out with blends prepared from graft copolymers 5, 6 and 7 from Table I again using the polyethylene CIL 560, in a weight ratio of 1:19. In this case the Accelerometer was fitted with a UV lamp of higher intensity, with the result that the films became brittle more quickly. A control film of CIL 560 polyethylene was similarly run. The results are given in Table III.

TABLE III

| | Hours in Accelerometer | Carbonyl Index |
|---|---|---|
| Control | 0 | 0.038 |
| | 40 | 0.085 |
| | 80 | 0.392 |
| Blend of Graft Copolymer 5 | 0 | 0.042 |
| | 40 | 0.112 |
| | 80 | 0.603 |
| Blend of Graft Copolymer 6 | 0 | 0.067 |
| | 40 | 0.167 |
| | 80 | 1.016 |
| Blend of Graft Copolymer 7 | 0 | 0.070 |
| | 40 | 0.202 |
| | 80 | 1.151 |

All of the above samples became brittle according to the crease-bend test within 120 hours of exposure.

The above results demonstrate the accelerated photodegradability upon exposure to ultraviolet radiation of the compositions of the invention, indicated by increasing carbonyl contents.

In other properties, the blended compositions according to the present invention are essentially similar to normally available commercial polyethylenes, and can be molded and fabricated in the same general way. Their shelf and storage life out of ultraviolet radiation is indefinite, as in the case of normal polymers.

Similar results are obtained by using as the backbone substrate for grafting purposes a higher molecular weight polyethylene, provided that sufficient shearing agitation is provided during the graft copolymerization step. For example, this process can conveniently be carried out in an extruder, the polymer being extruded at elevated temperature and the monomers and catalyst being added to the extrusion apparatus.

EXAMPLE 2

In this example, graft copolymer generally as previously described was blended with polypropylene and the resulting blends tested for photodegradability.

In a first experiment a commercially available ethylene propylene copolymer (NORDEL 1500, from E. I. duPont de Nemours and Company) was used as a grafting substrate, and into this was graft copolymerized methyl isopropenyl ketone. Pellets of the ethylene propylene copolymer were mixed with an approximately equal volume of water and catalyst (2% decanoyl peroxide) and monomer (14% methyl isopropenyl ketone) added, with stirring for an extended period of time to allow absorption of the monomer. Then the temperature was raised to 75°-80° C. to allow polymerization. After 5 half-lives of the catalyst, the pellets were filtered off, washed with water and dried. The resulting product contained 8 weight % of methyl isopropenyl ketone.

The graft copolymer so formed was blended with commercially available polypropylene (Shell 5520) on a two-roll mill, in the proportion 1 part by weight graft copolymer to 9 parts by weight polypropylene. A compatible blend was formed. Films of the blend were made by compression molding at 180° C. and 25000 psi, to produce films approximately 3/1000 inch thick. Samples of these films were exposed in a UV accelerometer as described in Example 1, alongside a similar sample film of the polypropylene as control.

After four hours exposure, the film of the blend had become brittle, whilst no such change was apparent with the polypropylene control.

As a further control, a blend of the ethylene-propylene copolymer and the polypropylene was prepared, in the same proportions and pressed into a similar film and similarly tested. No brittleness of this film was apparent after four hours exposure.

EXAMPLE 3

The graft copolymer number 4 described in Example 1 was blended with polypropylene as described in Example 2, at a weight ratio of 1:9, graft copolymer in minor proportion. Films were compression molded from this compatible blend, and tested for UV photodegradability, as described in Example 2.

The films were brittle after four hours exposure.

For comparison purposes, a 1:9 blend of low density polyethylene (CIL 560) and the polypropylene was similarly prepared, molded into a film and tested. This blend showed no apparent brittleness after four hours exposure.

Similar results are also obtained when using various other polymers as previously described, as the substrates onto which the monomers are grafted, and then blending the graft copolymers so formed with other similar polymers with which the graft copolymer is compatible.

It will be appreciated that the invention is not limited to the specific embodiments described and illustrated herein, but is defined in the appended claims.

What I claim is:

1. A synthetic polymer composition having accelerated degradation on exposure to ultraviolet radiation, comprising an intimate admixture of:
   (a) a major proportion of a normally solid synthetic polymer of at least one monomer having the general formula I:

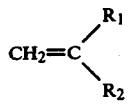

where $R_1$ represents a hydrogen atom or an alkyl group of from 1 to 6 carbon atoms, and $R_2$ is selected from the group consisting of a hydrogen atom, an alkyl group of from 1 to 6 carbon atoms, a phenyl group, a carboxylic acid group, a carboxylic acid lower alkyl ester group, a lower acyloxy group, a cyano group, an amido group and an alkenyl group of from 1 to 6 carbon atoms; and
   (b) a minor proportion of a compatible polymeric product of graft copolymerization of a grafting member onto a polymeric backbone, said polymeric backbone being a polymer of a first monomer of general formula II:

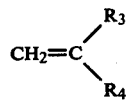

wherein $R_3$ represents a hydrogen atom or an alkyl group of from 1 to 6 carbon atoms and $R_4$ is selected from the same group of atoms or groups as $R_2$ above, and said grafting monomer having the general formula III:

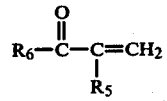

wherein $R_5$ represents a hydrogen atom or an alkyl group of from 1 to 6 carbon atoms, and $R_6$ is selected from the group consisting of alkyl groups having from 1 to 6 carbon atoms, aryl groups, alkaryl groups having up to 9 carbon atoms and alkenyl groups having up to 6 carbon atoms, said product of graft copolymerization containing from about 0.2 to about 20 weight percent of ketone carbonyl groups.

2. The composition of claim 1 wherein the monomer of general formula I is the same as the monomer of general formula II.

3. The composition of claim 2 wherein said product of graft copolymerization comprises graft copolymeric branches of said grafting monomer of general formula III and a third monomer copolymerizable with said grafting monomer, graft copolymerized onto said polymeric backbone of the first monomer.

4. The composition of claim 3 wherein said third monomer is selected from the group consisting of styrene, alphamethyl-styrene, diethylfumarte, methyl acrylate, methyl methacrylate, vinyl acetate, acrylic acid, and ethyl acrylate.

5. The composition of claim 2 wherein the monomer of general formula I and the monomer of general formula II are both ethylene.

6. The composition of claim 1 wherein said product of graft copolymerization contains from about 0.5 to about 7.0 weight percent of ketone carbonyl groups.

7. The composition of claim 1 wherein said product of graft copolymerization and said normally solid synthetic polymer are present in the composition in a weight ratio of from about 1:2 to about 1:50.

8. The composition of claim 5 wherein said product of graft copolymerization and said normally solid synthetic polymer are present in the composition in a weight ratio of from about 1:4 to about 1:24.

9. The composition of claim 7 wherein said second monomer of formula III is selected from the group consisting of methyl vinyl ketone, ethyl vinyl ketone, tertiary-butyl vinyl ketone, isobutyl vinyl ketone, isopropyl vinyl ketone, tertiary-amyl vinyl ketone, isoamyl vinyl ketone and methyl isopropenyl ketone.

10. The composition of claim 1 wherein the normally solid synthetic polymer is polypropylene, and the polymeric backbone of said polymeric product of graft copolymerization is polyethylene.

11. The composition of claim 1 wherein the normally solid synthetic polymer is polyethylene or polypropylene, and the polymeric backbone of said polymeric product of graft copolymerization is an ethylene-propylene copolymer.

12. A synthetic polymer composition having accelerated degradation on exposure to ultraviolet radiation, comprising an intimate admixture of:
   (a) a major proportion of low density polyethylene, and
   (b) a minor proportion of a compatible polymeric product of graft copolymerization of a vinyl or vinylidene ketone monomer onto a polyethylene backbone.

* * * * *